(12) United States Patent  (10) Patent No.: US 6,703,790 B2
Ohno  (45) Date of Patent: Mar. 9, 2004

(54) METHOD FOR DRIVING A SELF-SCANNING LIGHT-EMITTING ARRAY

(75) Inventor: Seiji Ohno, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/980,324

(22) PCT Filed: Apr. 6, 2001

(86) PCT No.: PCT/JP01/02983

§ 371 (c)(1),
(2), (4) Date: Nov. 30, 2001

(87) PCT Pub. No.: WO01/76883

PCT Pub. Date: Oct. 18, 2001

(65) Prior Publication Data

US 2002/0134930 A1 Sep. 26, 2002

(30) Foreign Application Priority Data

Apr. 6, 2000 (JP) ........................................ 2000-104431
Apr. 6, 2000 (JP) ........................................ 2000-104435

(51) Int. Cl.$^7$ ............................ G09G 3/10; B41G 2/435
(52) U.S. Cl. ..................... 315/169.3; 347/237; 347/238
(58) Field of Search ......................... 315/169.1–169.4; 347/237, 238, 247, 249, 248, 224

(56) References Cited

U.S. PATENT DOCUMENTS 5,177,405 A * 1/1993 Kusuda et al. ........... 315/169.1
5,969,744 A * 10/1999 Sakashita et al. ............ 347/237
6,008,833 A * 12/1999 Ohtsubo et al. ............. 347/237

FOREIGN PATENT DOCUMENTS

| JP | 08-153890 | 6/1996 |
| JP | 8-264838 | 10/1996 |
| JP | 10-119349 | 6/1997 |
| JP | 11-170596 | 5/1998 |

* cited by examiner

Primary Examiner—Tuyet T. Vo
(74) Attorney, Agent, or Firm—RatnerPrestia

(57) ABSTRACT

A method for driving a self-scanning light-emitting element array, in which a power consumed in a write signal limiting resistor provided outside a chip to suppress a temperature rising of an optical writing head. The difference between High-level and Low-level in a circuitry in the driver circuit for controlling the light-emitting portion in the chip is set so as to be lower than the difference between High-level and Low-level in a circuitry in the driver circuit for controlling the transfer portion in the chip. A power consumed in a write signal limiting resistor provided outside the chip may be decreased to suppress the temperature rising of the optical writing head.

7 Claims, 8 Drawing Sheets

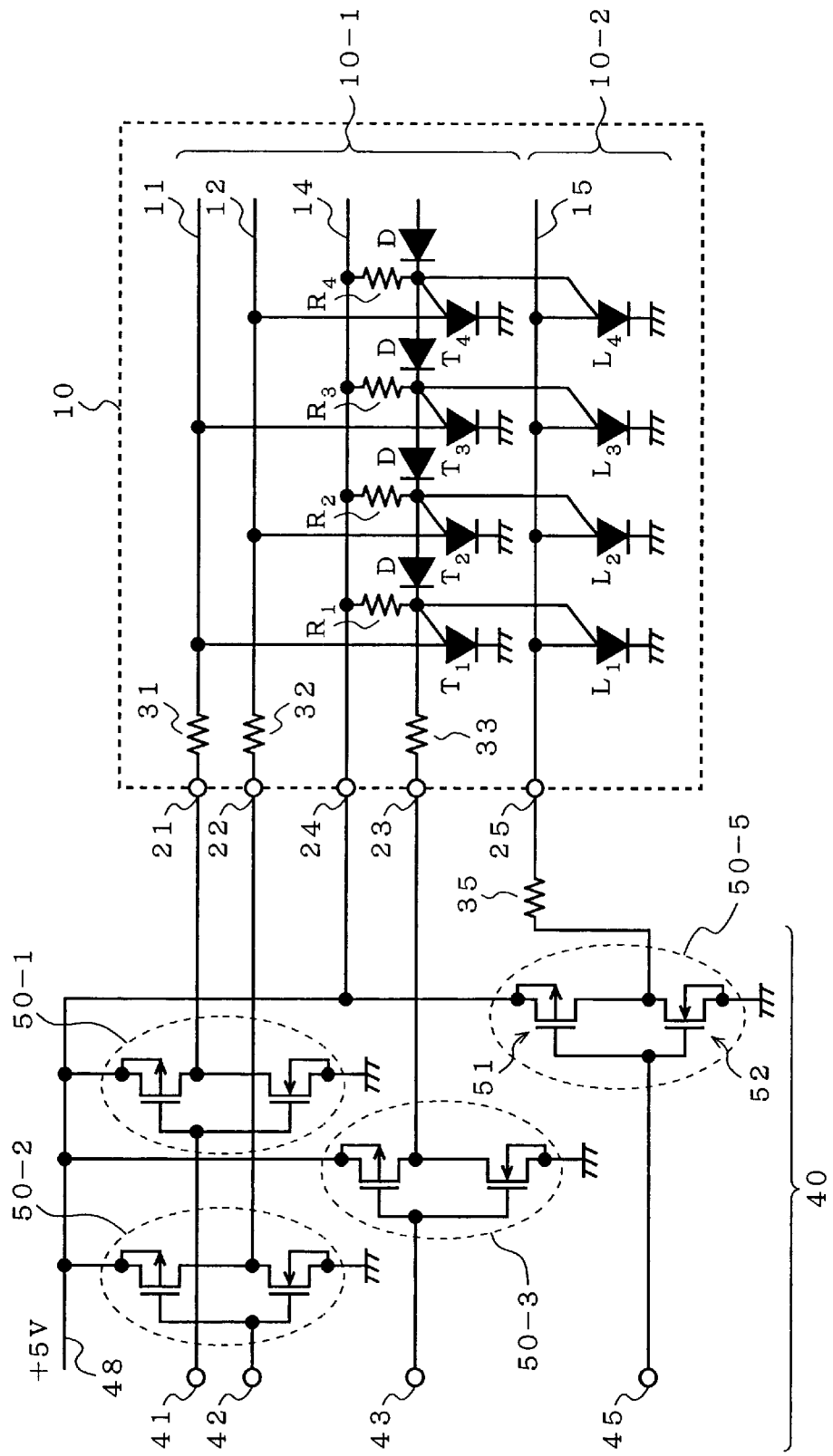
F I G. 1

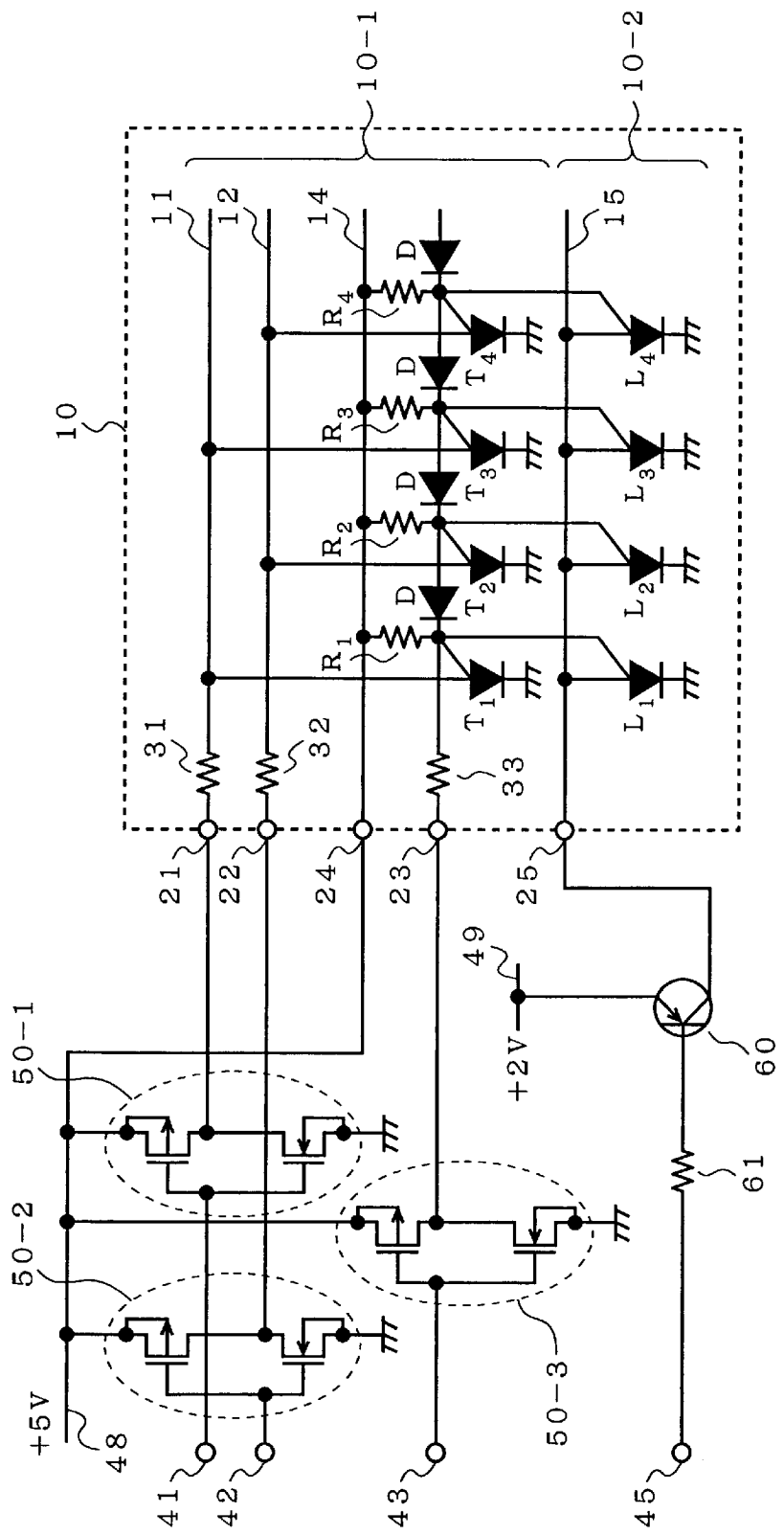
F I G . 3

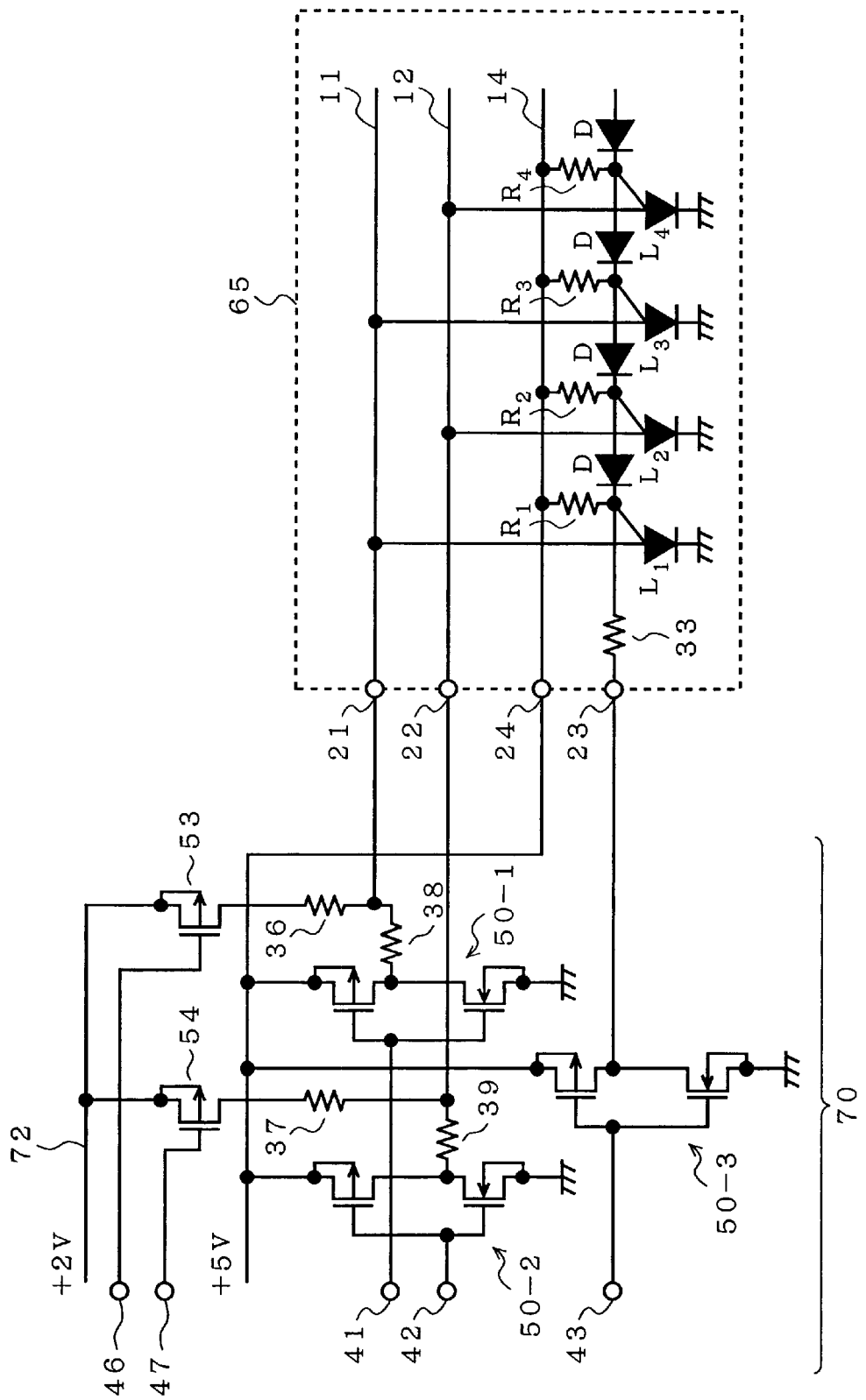
F I G. 4

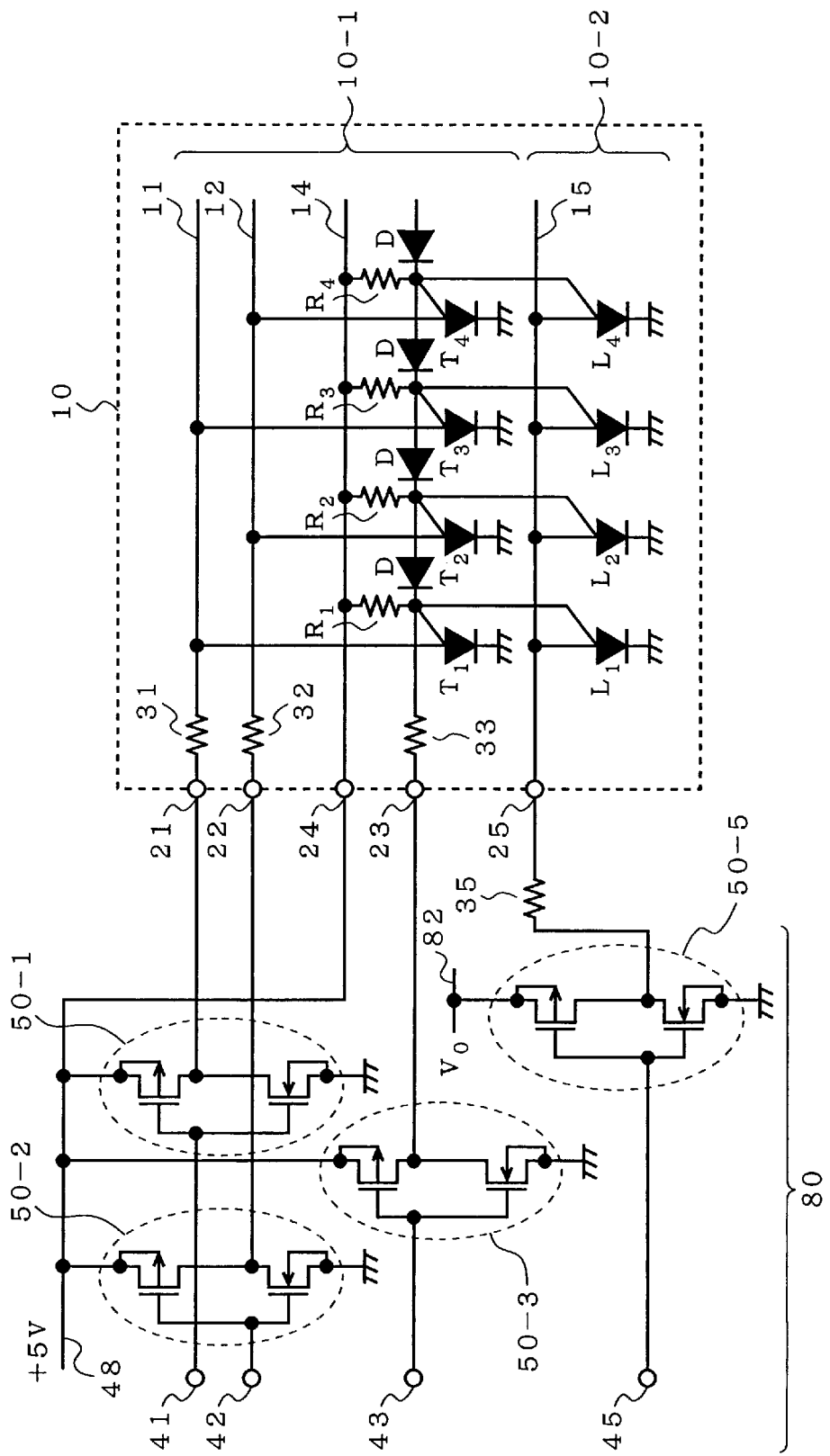
F I G. 5

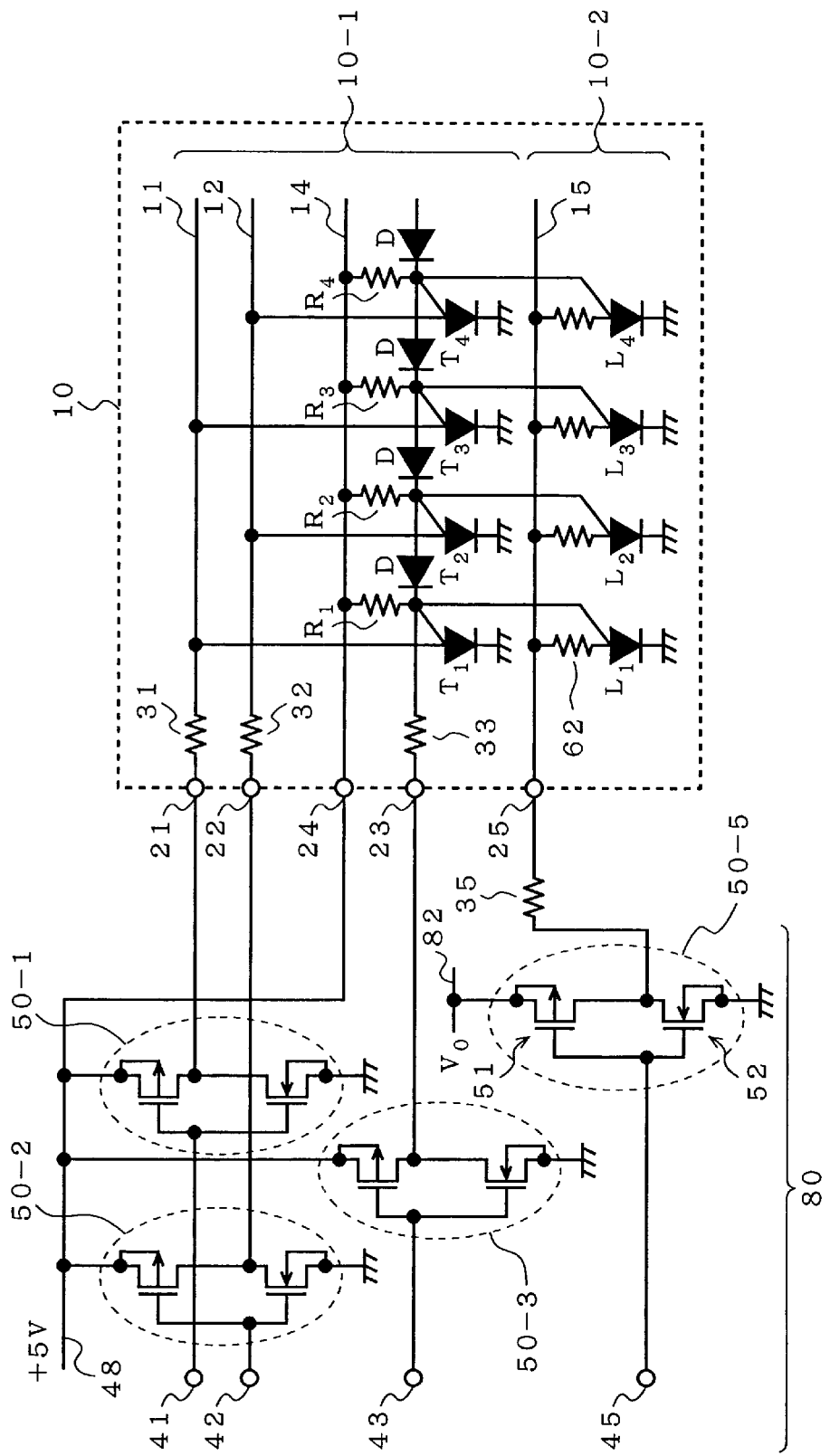
F I G. 7

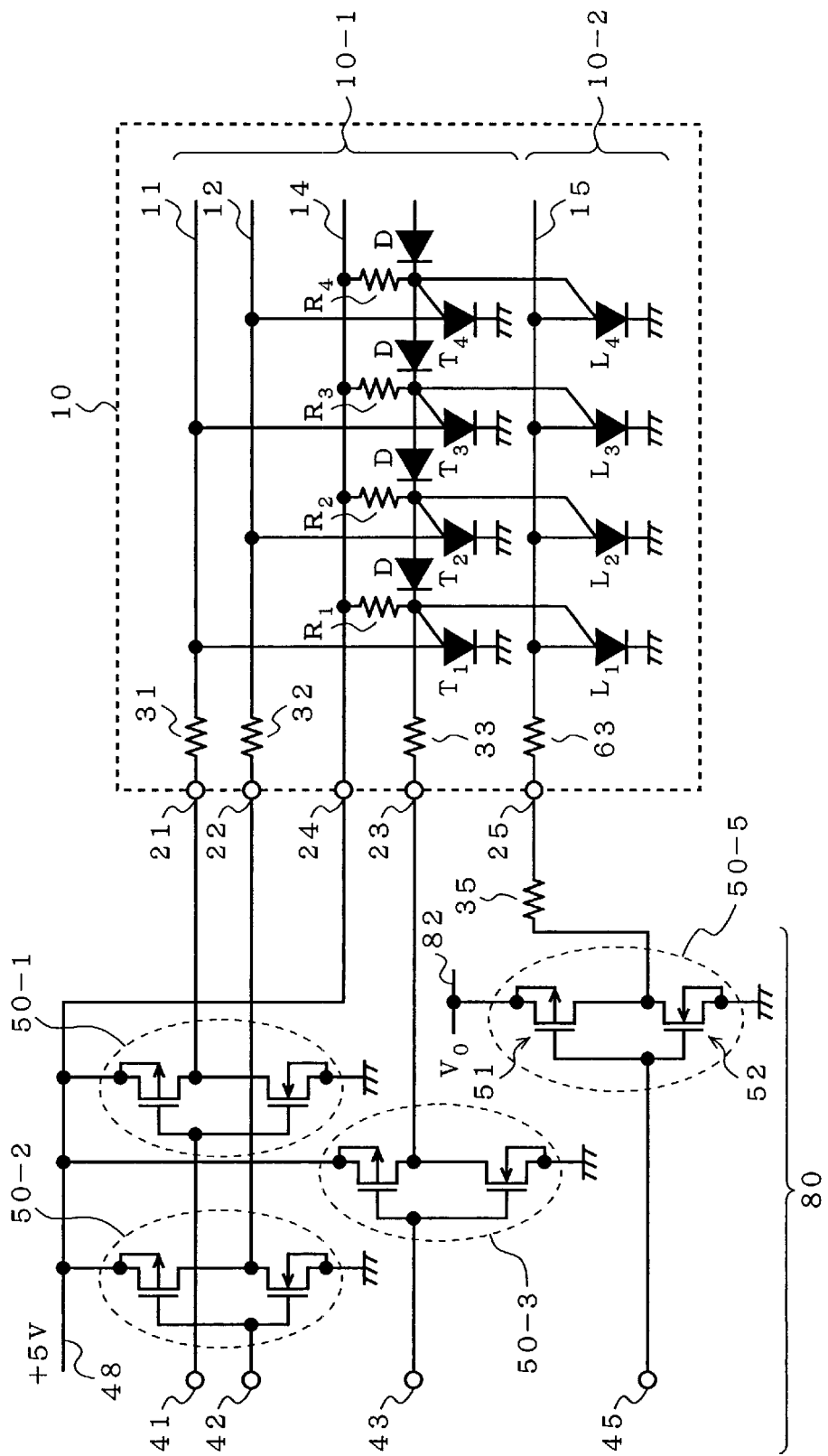
F I G . 8

METHOD FOR DRIVING A SELF-SCANNING LIGHT-EMITTING ARRAY

TECHNICAL FIELD

The present invention relates to a method for driving a self-scanning light-emitting element array, particularly to a method for driving a self-scanning light-emitting element array using three-terminal light-emitting thyristors.

BACKGROUND ART

A light-emitting element array in which a plurality of light-emitting elements are arrayed on the same substrate is utilized as a light source of a printer, in combination with a driver circuit. The inventors of the present invention have interested in a three-terminal light-emitting thyristor having a PNPN-structure as a component of the light-emitting element array, and have already filed several patent applications (for example, Japanese Patent Publication Nos. 1-238962, 2-14584, 2-92650, and 2-92651). These publications have disclosed that a self-scanning function for light-emitting elements may be implemented, and further have disclosed that such self-scanning light-emitting element array has a simple and compact structure for a light source of a printer, and has smaller arranging pitch of light-emitting elements.

The inventors have further provided a self-scanning light-emitting device having such structure that a transfer portion including a transfer element array is separated from a light-emitting portion including a light-emitting element array (see Japanese Patent Publication No. 2-263668).

Referring to FIG. 1, there is shown a self-scanning light-emitting element array chip 10 in which a transfer portion 10-1 is separated from a light-emitting portion 10-2, and a driver circuit 40 for driving the transfer portion and light-emitting portion, the self-scanning light-emitting element array chip being a type of two-phase (clock pulses Ø1 and Ø2) driving and diode coupling. The transfer portion 10-1 comprises transfer elements $T_1$, $T_2$, $T_3$, ..., diodes D, and load resistors $R_1$, $R_2$, $R_3$, .... The light-emitting portion 10-2 comprises light-emitting elements $L_1$, $L_2$, $L_3$, ... The transfer element and light-emitting element are composed of a three-terminal light-emitting thyristor, respectively.

The transfer portion 10-1 further comprises a Ø1 line 11, a Ø2 line 12, and a power supply ($V_{GK}$) line 14. The Ø1 line 11 is connected to a Ø1 terminal 21 through a current limiting resistor 31 provided within the chip 10, the Ø2 line 12 is connected to a Ø2 terminal 22 through a current limiting resistor 32 provided within the chip 10, and the $V_{GK}$ line 14 is connected to a $V_{GK}$ terminal 24. The gate of a transfer element $T_1$ is connected to a start pulse ($Ø_s$) terminal 23 through a current limiting resistor 33.

The light-transmitting portion 10-2 comprises a write signal ($Ø_I$) line 15 which is connected to a $Ø_I$ terminal 25.

The driver circuit 40 comprises four CMOS inverters 50-1, 50-2, 50-3 and 50-5 each consisting of a PMOS transistor (normally on) 51 and an NMOS transistor (normally off) 52. Each high level terminal of the CMOS converters is connected to a common power supply (+5V) line (or +5V power supply) 48.

The driver circuit 40 further comprises an input terminal 41 for Ø1, an input terminal 42 for Ø2, an input terminal 43 for $Ø_S$, and an input terminal 45 for $Ø_I$.

A current limiting resistor 35 is provided between the CMOS inverter 50-5 of the driver circuit 40 and the $Ø_I$ terminal 25 of the light-emitting element array chip 10, and outside the chip 10.

The operating voltage of the transfer portion 10-1 of the self-scanning light-emitting array shown in FIG. 1 is needed to be at least $2V_D$ ($V_D$ is a forward voltage of PN-junction in a light-emitting thyristor). $V_D$ is about 1.5V when the material for PNPN-structure is GaAs, so that the minimum operating voltage for the transfer portion becomes 3 volts. In practice, the self-scanning light-emitting element array is operated by a single power supply of about 5 volts in order not to be unstable in operation due to a parasitic resistance and a noise.

In the conventional self-scanning light-emitting array shown in FIG. 1, when a power supply voltage of 5 volts is used, the turn-on voltage of a light-emitting thyristor in the light-emitting portion 10-2 is substantially equal to the forward voltage $V_D$ (1.5 volts) of PN-junction. Therefore, a voltage drop of 3.5 (=5–1.5) volts is caused across the resistor 35 provided outside the chip. Assuming that a current through the light-emitting portion is 10 mA (an average value in time), a power consumed in the resistor 35 is 35 mW. On the other hand, a power consumed in the light-emitting portion is 15 mW. Therefore, when a plurality of self-scanning light-emitting element array chips, for example 60 chips are arrayed to form an optical writing head, the total power consumed in the head when one light-emitting element per chip is lighted up becomes 3W (=50 mW×60 chips). The heat generated by consumed power causes the temperature rising of the self-scanning light-emitting element array chip, resulting in the problem of the decrease of the luminous efficiency of light-emitting elements. In addition, the optical writing head is positioned in a narrow and bad exhaust head environment, so that the temperature in the printer rises to have an effect on the image formed by an electrophotographic printer.

As to the effect on the image due to the temperature rising of self-scanning light-emitting element array chips, the following causes are conceivable.

(1) When a pattern being light in color such as half-tone is printed just after printing a table including horizontal rules, a part of the pattern corresponding to the horizontal rules is missed in color, resulting in the degradation of an image quality. This is because the particular distribution in temperature is caused on the chip due to the printing of horizontal rules, and the luminous efficiency of the light-emitting elements contributing to the printing of horizontal rules is decreased.

(2) Whereas the temperature of the head at the start of printing is low, the temperature within the printer is gradually increased, so that the light output of the head is varied. This variation is large at the beginning of the printing, resulting in the problem.

(3) In the case of a self-scanning light-emitting element array having a structure such that adjacent light-emitting elements may be possible to be lighted up at the same time, the temperature rising is varied based on whether one light-emitting element is lighted up together with the other light-emitting element. As a result, there is a problem in that the photographic density is varied depending upon a pattern to be printed.

(4) The volume of a body through which the heat is dispersed at the light-emitting elements at the both ends of the chip is one-half of that at the center of the chip, resulting in a high heat resistance of said body. Therefore, the temperature rising of the light-emitting elements at the both ends of the chip becomes two times that at the center of the chip. As a result, there is a problem in that the light output at the both ends of the chip is decreased.

In order to resolve these problems, the technique has been proposed in which a uniform temperature distribution may be realized through a chip by causing the power consumption at the transfer portion when the light-emitting elements are not lighted up (see Japanese Patent Publication Nos. 8-264838 and 11-170596). According to this technique, the problem of an image degradation in the case (1) described above may be addressed, but the temperature rising of the head becomes larger because the same power as that when all the light-emitting elements are lighted up is consumed. The percentage of light-emitting elements lighted up is less than 20% in the case of conventional color printing, so that it is not effective to design an optical writing head under the assumption that all the light-emitting elements are always lighted up. Also, this technique may not address the problem of the variation of light output at the beginning of the printing in the case (2) described above.

While the technique has been proposed in which the printing is not carried out when the temperature variation is extreme at the beginning of printing (see Japanese Patent Publication Nos. 10-119349 and 10-235936), this technique addresses only the problems in the case (2) described above. Furthermore, the temperature variation of the head is not uniform depending upon the pattern of an image and may not be corrected. In addition, the technique has been proposed in which the light output of light-emitting elements is compensated based on the time duration of lighting up by monitoring the anode voltage of light-emitting elements being on-state (see Japanese Patent Publication No. 9-311664), but a complicated circuitry is required in this technique.

DISCLOSURE OF THE INVENTION

An object of the present invention therefore is to provide a method for driving a self-scanning light-emitting element array, in which a power consumed in a write signal limiting resistor provided outside a chip to suppress a temperature rising of an optical writing head.

Another object of the present invention is to provide a method for driving a self-scanning light-emitting element array, the temperature dependency of light output thereof is small, i.e. the temperature coefficient of light output may be reduced.

A first aspect of the present invention is a method for driving a self-scanning light-emitting element array including a self-scanning transfer element array having such a structure that a plurality of three-terminal transfer elements each having a control electrode for controlling threshold voltage or current are arranged, the control electrodes of the transfer elements neighbored to each other are connected via first electrical means, a power supply line is connected to the control electrodes via second electrical means, and clock lines are connected to one of two terminals other than the control electrodes of each of the transfer elements; and a light-emitting element array having such a structure that a plurality of three-terminal light-emitting elements each having a control electrode for controlling threshold voltage or current are arranged, the control electrodes of the light-emitting element are correspondingly connected to the control electrodes of the transfer elements, and a write signal line connected to one of two terminals other than the control electrode of each of the light-emitting elements is provided. This method comprises a step of causing the difference between Low-level and High-level of a pulse voltage for a write signal supplied to the write signal line through a current limiting resistor smaller than the difference between Low-level and High-level of a pulse voltage for transfer supplied to the clock lines, so as to decrease a power consumed by the current limiting resistor.

A second aspect of the present invention is a method for driving a self-scanning light-emitting element array including a self-scanning transfer element array having such a structure that a plurality of three-terminal transfer elements each having a gate electrode for controlling threshold voltage or current are arranged, the gate electrodes of the transfer elements neighbored to each other are connected via first electrical means, a power supply line is connected to the gate electrodes via second electrical means, and clock lines are connected to an anode of each of the transfer elements; and a light-emitting element array having such a structure that a plurality of three-terminal light-emitting elements each having a gate electrode for controlling threshold voltage or current are arranged, the gate electrodes of the light-emitting element are correspondingly connected to the gate electrodes of the transfer elements, and a write signal line for applying a current connected to an anode of each of the light-emitting elements is provided. This method comprises a step of determining a voltage of a constant voltage source by which the write signal line is driven via a current limiting resistor so that the temperature coefficient of a light output at a constant current is cancelled by the temperature coefficient of a current supplied to the light-emitting element.

BRIEF DESCRIPTION OF THE DRAWINGS

FIG. 1 is an equivalent circuit diagram of a self-scanning light-emitting element array in which a transfer portion is separated from a light-emitting portion, and a driver circuit.

FIG. 3 is an equivalent circuit diagram of a self-scanning light-emitting element array of an embodiment 2 according to the present invention.

FIG. 4 is an equivalent circuit diagram of a self-scanning light-emitting element array of an embodiment 3 according to the present invention.

FIG. 5 is an equivalent circuit diagram of a self-scanning light-emitting element array of an embodiment 4 according to the present invention.

FIG. 7 is an equivalent circuit diagram of a self-scanning light-emitting element array of an embodiment 5 according to the present invention.

FIG. 8 is an equivalent circuit diagram of a self-scanning light-emitting element array of an embodiment 6 according to the present invention.

BEST MODE FOR CARRYING OUT THE INVENTION

The preferred embodiments of the present invention will now be described hereinafter accompanying with the drawings.

Embodiment 1

In order to operate stably the transfer portion of a self-scanning light-emitting element array, the operating voltage of the transfer portion must have a sufficient margin with respect to a minimum voltage of $2V_D$. On the other hand, the light-emitting portion is operated so as to be turned on when the transfer portion is in turned-on state, so that the light-emitting portion may be stably lighted up by an operating voltage slightly larger than the minimum voltage $V_D$.

Therefore, if the difference between High-level and Low-level in a circuitry in the driver circuit for controlling the light-emitting portion in the chip is set so as to be lower than the difference between High-level and Low-level in a circuitry in the driver circuit for controlling the transfer portion in the chip, then a power consumed in a write signal limiting resistor provided outside the chip may be decreased to suppress the temperature rising of an optical writing head.

Figure 2:
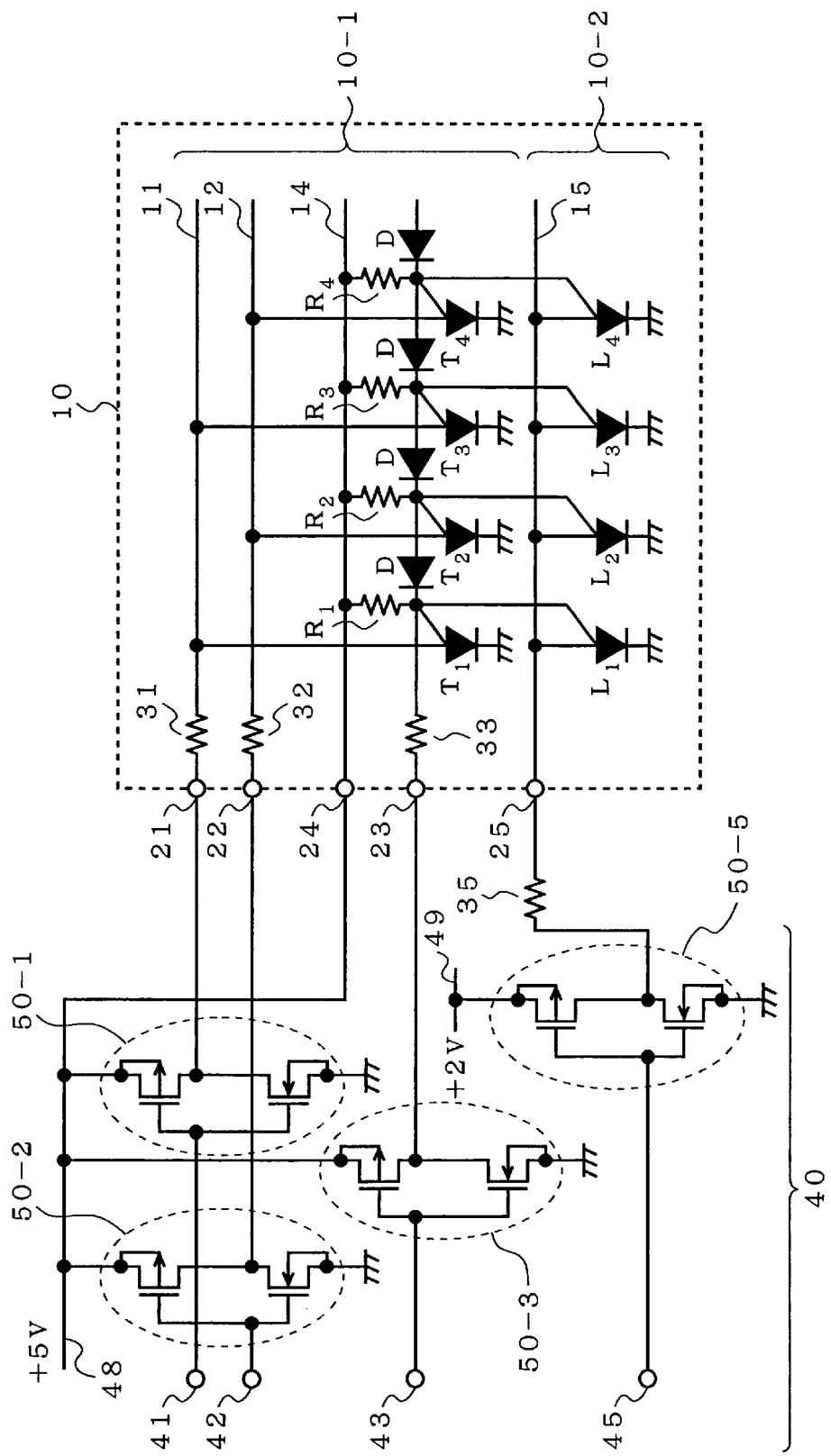
FIG. 2 is an equivalent circuit diagram of a self-scanning light-emitting element array of an embodiment 1 according to the present invention.

Referring to FIG. 2, there is shown an equivalent circuit diagram of a self-scanning light-emitting element array of an embodiment 1 according to the present invention. The high level terminal of a CMOS inverter 50-5 is connected to the power supply (+2V) line (or +2V power supply) 49 independent from the power supply (+5V) line (or +5V power supply) 48, the CMOS inverter 50-5 being connected to the $Ø_I$ terminal 25 of a self-scanning light-emitting element array chip 10 via a resistor 35 provided outside the chip. Another structure is the same as that in FIG. 1, therefore like reference numerals are used for describing like elements.

Using the power supply line of +2V, the voltage drop across the resistor 35 is about 0.5V, so that the power consumed in the resistor 35 is decreased from 35 mW to 5 mW when a current of 10 mA flows through the resistor 35, i.e. is decreased by a factor of 7. Therefore, the power consumed in the head becomes 20 mW (=5 mW+15 mW) which is the total of the power consumed in the resistor 35 and the power consumed in the light-emitting portion. Therefore, the power consumed in the head may be decreased to be two-fifth of the power consumed in the conventional head.

Embodiment 2

In the embodiment 1, the value of a current through the light-emitting elements is determined by a potential difference across the resistor 35. On the contrary, a constant current circuit is used to determine the value of a current through light-emitting elements according to the present embodiment. A circuit diagram of the present embodiment is shown in FIG. 3.

A constant current circuit using a PNP transistor 60 is herein shown. The gate of this transistor is connected to an input terminal 45 for $Ø_I$ through a resistor 61, the emitter is connected to a power supply (+2V) line (or +2V power supply) 49, and the collector is connected to a $Ø_I$ terminal 25. Another structure is the same as that in FIG. 1, therefore like reference numerals are used for describing like elements.

Assuming that the emitter voltage $V_E$ of the transistor 60 is +2V, the resistance of the resistor 61 is $R_B$, and the threshold voltage between the base and emitter of the transistor 60 is $V_{BE}$, the base current of the transistor 60 is represented by $(V_E-V_{BE})/R_B$. Assuming that $I_E$ is an emitter current, $(V_E-V_{BE})/R_B$ is equal to $(1-\alpha)I_E$, wherein $\alpha$ is a current amplification factor which is generally in a range of about 0.95–0.99. On the other hand, the collector current $I_C$ is $\alpha I_E$, which contributes the light emission of the light-emitting portion 10-2. For example, if $\alpha$ is selected to be 0.95, and $R_B$ is selected to 20 kΩ, then the collector current $I_C$ is calculated as follows; $I_C=(\alpha/(1-\alpha))\cdot(V_E-V_{BE})/R_B=19\times(2-0.6)/2\times10^4 \approx 13$ mA Because the power represented by the product of the potential difference between the emitter and collector and the collector current (≈the emitter current) is consumed in the transistor 70, the power consumed in the transistor 70 may be decreased as the emitter voltage is reduced.

While a transistor is utilized as a simple example, similar effect may be expected for any similar constant current circuit, because it is same as a transistor in that a power represented by the product of "a potential difference between the power supply line 49 and the terminal 25" and "a current through therebetween".

Embodiment 3

While a transfer portion and light-emitting portion are separated each other in the embodiments 1 and 2, an example having a structure such that a transfer portion and light-emitting portion are integrally structured is shown in FIG. 4. In the figure, there is shown a self-scanning light-emitting element array chip 65 having a structure such that a transfer portion and light-emitting portion is not separated and a driver circuit 70 thereof, the self-scanning light-emitting element array chip being a type of two-pulse driving and diode coupling. The self-scanning light-emitting element array chip 60 comprises light-emitting elements $L_1$, $L_2$, $L_3$, . . . , diodes D, and load resistors $R_1$, $R_2$, $R_3$, . . . . The light-emitting element is composed of a three-terminal light-emitting thyristor.

The chip 65 further comprises a Ø1 line 11, a Ø2 line 12, and a power supply ($V_{GK}$) line 14. The Ø1 line 11 is connected to a Ø1 terminal 21, the Ø2 line 12 is connected to a Ø2 terminal 22, and the $V_{GK}$ line 14 is connected to a $V_{GK}$ terminal 24. The gate of a light-emitting element $L_1$ is connected to a start pulse ($Ø_S$) terminal 23.

The driver circuit 70 comprises CMOS inverters 50-1 and 50-2 for providing two phase clock pulses Ø1 and Ø2 to the Ø1 terminal 21 and Ø2, respectively, and a CMOS inverter 50-3 for providing a start pulse $Ø_S$ to the $Ø_S$ terminal 23.

The driver circuit 70 further comprises a serial circuit consisting of a PMOS transistor 53 and a current limiting resistor 36, which supplies a pulse voltage for light emission (i.e., a write signal $Ø_I$) to the Ø1 and Ø2 terminals 21 and 22, and a serial circuit consisting of a PMOS transistor 54 and a current limiting resistor 37. The high level terminals of these PMOS transistors 53 and 54 are connected to a power supply (+2V) line (or +2V power supply) 72. Resistors 36 and 37 are provided in the driver circuit 70, which correspond to the current limiting register 35 in FIG. 2 The resistors 38 and 39 are also provided in the driver circuit 70, which correspond to the current limiting resistor 31 and 32 (provided in the chip) in FIG. 2, respectively.

In FIG. 4, reference numerals 46 and 47 denote input terminals for $Ø_I$, respectively. It should be noted that like reference numerals in FIG. 2 are used for describing like elements in FIG. 4.

According to the present embodiment, when a light-emitting element is turned on by a clock pulse Ø1 or Ø2, a write signal is supplied to the terminal 21 or 22 through the resistor 36 or 37 by causing a corresponding PMOS transistor 53 or 54 to turn on. In this case, a power supply of +2V is used, so that the power consumed in the resistors 36 and 37 is decreased. As a result, the temperature rising of the optical writing head may be suppressed.

Embodiment 4

A self-scanning light-emitting element array will now be described, in which the temperature dependency of light output thereof is small, i.e. the temperature coefficient of light output may be reduced.

The temperature coefficient of an anode voltage of a three-terminal light-emitting thyristor of PNPN-structure which is in on-state is negative. Therefore, when the light-emitting thyristors are driven via a current limiting resistor from a constant voltage source, the anode voltage is decreased as a temperature of the thyristor is increased. As a result, the voltage drop across the resistor provided outside the chip is increased, and then a current supplied to the light-emitting thyristors is increased. Utilizing this characteristic, the decrease of a luminous efficiency of the light-emitting thyristor may be compensated according to the present invention. For this purpose, the light-emitting thyristor is driven by a power supply voltage such that the temperature coefficient of a voltage drop across the resistor, i.e. the temperature coefficient of the current supplied to the thyristors cancels the temperature coefficient of light output of the thyristor at a constant current. In this manner, the anode voltage and the light output are varied simultaneously by the temperature and may be compensated each other to minimize the influence of the temperature distribution. That is, it is important aspect according to the present invention that the temperature coefficient of light output at a constant current is cancelled by the temperature coefficient of a current supplied to the thyristor so that the influence for light output may be eliminated.

A driver circuit 80 as shown in FIG. 5 is considered, in which the high-level value of a clock pulse supplied to the transfer portion 10-1 and the high-level value of a write signal supplied to the light-emitting portion 10-2 may be determined independently. In the driver circuit 80, the high-level terminal of a CMOS inverter 50-5 connected through a current limiting resistor 35 to a $\phi_I$ terminal 25 of a self-scanning light-emitting element array chip 10 is connected to a power supply ($V_O$) line (or $V_O$ power supply) 82 which is independent from the power supply (+5V) line (or +5V power supply) 48. Another constitution in FIG. 5 is the same as that in FIG. 1, so that like numeral number is used for describing like element.

When the light-emitting portion is driven by the constant voltage of $V_O$, the temperature coefficient E of a current i supplied to the light-emitting portion 10-2 around a constant current $i^0$ is denoted by;

$$E = B/(V_O - V_A)$$

wherein $V_A$ is an anode voltage of a light-emitting thyristor and B is the temperature coefficient of the anode voltage $V_A$. In general, the light output L ($\mu$W) of a light-emitting thyristor is determined by the current i (mA) in the case that the temperature is constant, and is denoted by L=Ci −D, wherein C and D are constant, i.e. C=10 and D=30.

As the rate of change of the light output L for the current around the constant current $i_0$ is denoted by $Ci_0/(Ci_0-D)$, the temperature coefficient θ of the light output L for the variation of the anode voltage $V_A$ is denoted by the following expression $$\theta = [B/(V_O - V_{A0})] \times [Ci_0/(Ci_0-D)] \quad (1)$$

wherein $V_{A0}$ is an anode voltage at a room temperature. If the temperature coefficient θ is cancelled by the temperature coefficient A of the light output L at a constant current, then the variation of the light output due to a temperature change becomes zero. Therefore, substituting θ=−A into the expression (1) to solve for ($V_O-V_A$), the following expression;

$$V_O - V_A = B \times Ci_0 / [(Ci_0-D) \times A] \quad (2)$$

is obtained.

Estimating the temperature characteristic of the self-scanning light-emitting element array shown in FIG. 5, the temperature coefficient A of the light output was −0.5%/° C.

The anode voltage $V_A$ of a light-emitting element at a room temperature was 1.5V(=$V_{A0}$), and the temperature coefficient B of the anode voltage $V_A$ was −1.5 mV/° C.

If these values are substituted into the expression (2), the following expression is established.

$$V_O - V_A = -0.0015 \times 10 \times 10 / [(10 \times 10 - 30) \times (-0.005)] = 0.4286 V$$

Accordingly, if $V_O$=1.9286 volts is selected, the variation of light output due to a temperature change becomes zero.

In this case, the current limiting resistor 35 is required to cause a voltage drop of 0.4286 volts, so that the resistance R thereof is selected to be 42.8(=0.4286/0.01)Ω.

Embodiment 5

In the embodiment 4 described above, the value of ($V_O-V_A$) is at most 0.5 volts, then the driver circuit is not easy to be structured. In order to make the structure of the driver circuit easy, it is required to increase the value of $V_O$.

Figure 6:
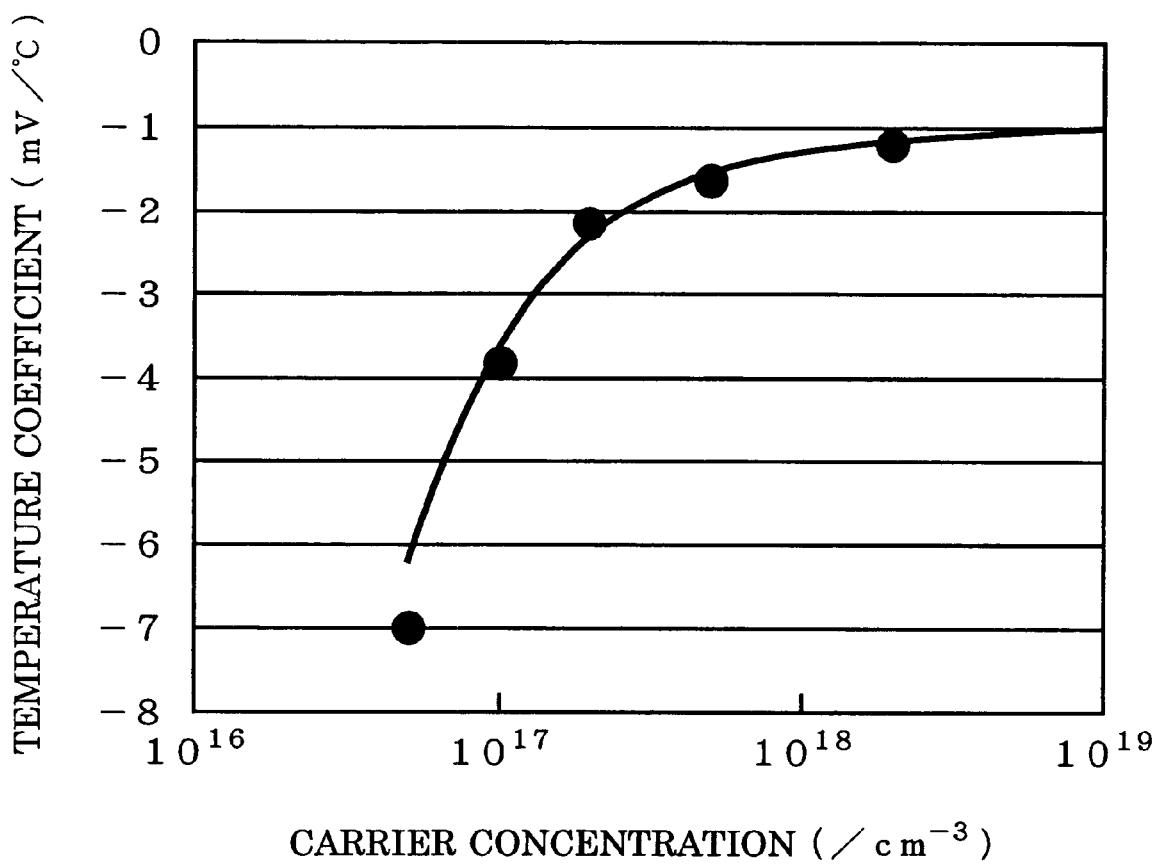
FIG. 6 is a graph illustrating the relationship between the power supply voltage and the temperature coefficient of light output.

According to the experiment by the inventors of the present application, it has been appreciated that when the carrier concentration in an anode layer of a light-emitting thyristor is caused to be varied, the anode voltage $V_A$ becomes larger as the carrier concentration is decreased, and accordingly the temperature coefficient of the anode voltage $V_A$ is increased. The results of the experiment is shown in FIG. 6. This result is considered to be based on the following reasons.

(1) The anode voltage $V_A$ is the sum of the forward voltage $V_D$ of PN junction and the voltage drop due to a parasitic resistor $R_P$. Therefore, as the resistance of the parasitic resistor of the anode layer is increased, the anode voltage is increased by the voltage drop due to the increase of the resistance of the parasitic resistor.

(2) The temperature coefficient of the resistance of semiconductor layers is negative, and is comparatively large as several %/° C.

(3) The temperature coefficient of a forward voltage $V_D$ of PN junction is principally operated when the resistance of semiconductor layers is small, but the temperature of a parasitic resistor may not be neglected when the resistance of the parasitic resistor is large.

While the carrier concentration of an anode layer has been varied in the above-described experiment, the inventors of the present application has confirmed that the resistance of the parasitic resistor was also increased when a carrier concentration in a cathode layer or a substrate was caused to be varied, resulting in the same effects.

In the graph of FIG. 6, the temperature coefficient of the anode voltage $V_A$ was −7 mV/° C. when the carrier concentration of the anode layer was $5 \times 10^{16}$/cm$^{-3}$. When the self-scanning light-emitting element array chip in which the light-emitting thyristor having said anode layer is used as a light-emitting element in the same circuit as in FIG. 5, the value of ($V_O-V_A$) is 2 volts according to the expression (2), and then the voltage $V_O$ of power supply is 3.5 volts. Therefore, the driver circuit may be easily structured in comparison with that in the embodiment 4.

Embodiment 6

In the embodiment 5, the temperature coefficient of the anode voltage $V_A$ is regulated by regulating the resistance of the parasitic resistor. However, the parasitic resistor and the forward voltage $V_D$ are determined by an epitaxial structure, then they can not be controlled by a process. Therefore, a resistor may be positively formed in a light-emitting element (a light-emitting thyristor) in place of regulating the resistance of the parasitic resistor. FIG. 7 shows a equivalent circuit of a self-scanning light-emitting element array in which a resistor 62 is provided in series to each light-emitting element $L_1$, $L_2$, $L_3$, . . . . It should be noted that another structure is the same as that in FIG. 5.

The resistor 62 was formed using an N gate layer of a light-emitting thyristor, the sheet resistance thereof was 225 $\Omega/\square$. The resistance of the formed resistor 60 was 56.25 $\Omega$. Also, the temperature coefficient of the resistor was 2%/° C. Therefore, the temperature coefficient of the anode voltage $V_A$ was $-11.25$ mV/° C. ($=56.25\ \Omega \times (-2\%) \times 10$ mA) when the current of 10 mA flew. Adding the temperature coefficient of a forward voltage $V_D$ to $-11.25$ mV/° C., the final temperature coefficient of the anode voltage $V_A$ became $-12.25$ mV/° C. Therefore, $V_0-V_A$ was 3.5 volts according to the expression (2), as a result a self-scanning light-emitting element array chip which was not subjected to the influence of a temperature at $V_0=5.0$ volts was implemented.

Embodiment 7

In the embodiment 6, one resistor is provided to each light-emitting element, respectively. Therefore, the effect of the temperature of each light-emitting element may be reflected to the temperature coefficient of the anode voltage $V_A$, respectively. However, the circuit of a self-scanning light-emitting element chip in this case becomes complicated. On the contrary, only one resistor is provided in the $\emptyset_I$ line 15 according to the present embodiment. In FIG. 8, there is shown an equivalent circuit of a self-scanning light-emitting element array according to the present embodiment, in which a resistor 63 is provided in the $\emptyset_I$ line 15. It should be noted that another structure is the same as that in FIG. 5.

In the present embodiment, only the problem related to the case (2) described above may be addressed. If the resistor 63 which has the same resistance as the resistor 62 in the embodiment 6, then a self-scanning light-emitting element array chip which is not subjected to the influence of a temperature at $V_0=5V$ may be implemented.

While the present invention has been described with specific embodiments, it is apparent to those skilled in the art that many alternatives, modifications and variations may be intended within the scope of the present invention. For example, whereas the example in which the cathodes of light-emitting thyristors are commonly grounded are illustrated, the present invention may be applied to a self-scanning light-emitting element array in which the anodes are commonly grounded by changing the plurality of a power supply voltage.

INDUSTRIAL APPLICABILITY

As described above, the temperature rising of an optical writing head may be suppressed by decreasing a power consumed in a current limiting resistor in a self-scanning light-emitting element array according to the present invention. Also, according to the present invention, the temperature coefficient of light output may be decreased, because the anode voltage and the light output are varied simultaneously and are compensated each other based on the temperature of light-emitting elements.

What is claimed is:

1. A method for driving a self-scanning light-emitting element array including a self-scanning transfer element array having such a structure that a plurality of three-terminal transfer elements each having a control electrode for controlling threshold voltage or current are arranged, the control electrodes of the transfer elements neighbored to each other are connected via first electrical means, a power supply line is connected to the control electrodes via second electrical means, and clock lines are connected to one of two terminals other than the control electrodes of each of the transfer elements; and a light-emitting element array having such a structure that a plurality of three-terminal light-emitting elements having a control electrode for controlling threshold voltage or current are arranged, the control electrodes of the light-emitting element are correspondingly connected to the control electrodes of the transfer elements, and a write signal line connected to one of two terminals other than the control electrode of each of the light-emitting elements is provided;

the method comprising a step of causing the difference between Low-level and High-level of a pulse voltage for a write signal supplied to the write signal line through a current limiting resistor smaller than the difference between Low-level and High-level of a pulse voltage for transfer also supplied to the clock lines, so as to decrease a power consumed by the current limiting resistor.

2. A method for driving a self-scanning light-emitting element array including a light-emitting element array having such a structure that a plurality of three-terminal light-emitting elements each having a control electrode for controlling threshold voltage or current are arranged, the control electrodes of the light-emitting elements neighbored to each other are connected to the control electrodes via second electrical means, and clock lines are connected to one of two terminals other than the control electrodes of each of the light-emitting elements, the method comprising a step of causing the difference between Low-level and High-level of a pulse voltage for a write signal supplied to the clock lines through a current limiting resistor smaller than the difference between Low-level and High-level of a pulse voltage for transfer also supplied to the clock lines, so as to decrease a power consumed by the current limiting resistor.

3. A method for driving a self-scanning light-emitting element array including a self-scanning transfer element array having such a structure that a plurality of three-terminal transfer elements each having a gate electrode for controlling threshold voltage or current are arranged, the gate electrodes of the transfer elements neighbored to each other are connected via first electrical means, a power supply line is connected to the gate electrodes via second electrical means, and clock lines are connected to an anode of each of the transfer elements; and a light-emitting element array having such a structure that a plurality of three-terminal light-emitting elements each having a gate electrode for controlling threshold voltage or current are arranged, the gate electrodes of the light-emitting element are correspondingly connected to the gate electrodes of the transfer elements, and a write signal line for applying a current connected to an anode of each of the light-emitting elements is provided;

the method comprising a step of determining a voltage of a constant voltage source by which the write signal line is driven via a current limiting resistor so that the temperature coefficient of a light output at a constant current is cancelled by the temperature coefficient of a current supplied to the light-emitting element.

4. A self-scanning light-emitting element array comprising:

a self-scanning transfer element array having such a structure that a plurality of three-terminal transfer elements each having a gate electrode for controlling threshold voltage or current are arranged, the gate electrodes of the transfer elements neighbored to each other are connected via first electrical means, a power supply line is connected to the gate electrodes via second electrical means, and clock lines are connected an anode of each of the transfer elements;

a light-emitting element array having such a structure that plurality of three-terminal light-emitting elements each having a gate electrode for controlling threshold voltage or current are arranged, the gate electrodes of the light-emitting element being correspondingly connected to the gate electrodes of the transfer elements; and a write signal line for applying a current to an anode of each of the light-emitting elements;

wherein the carrier concentration of an anode layer, a cathode layer, or a substrate of the light-emitting element is decreased to increase the resistance of a parasitic resistor of the light-emitting element.

5. A method for driving a self-scanning light-emitting element array according to claim 4, comprising a step of determining a voltage of a constant voltage source by which the write signal line is driven via a current limiting resistor so that the temperature coefficient of a light output at a constant current is cancelled by the temperature coefficient of a current supplied to the light-emitting element.

6. A method for driving a self-scanning light-emitting element array comprising a self-scanning transfer element array having such a structure that a plurality of three-terminal transfer elements each having a gate electrode for controlling threshold voltage or current are arranged, the gate electrodes of the transfer elements neighbored to each other are connected via first electrical means, a power supply line is connected to the gate electrodes via second electrical means and clock lines are connected to an anode of each of the transfer elements via light-emitting element array having such a structure that a plurality of three-terminal light-emitting elements each having a gate electrode for controlling threshold voltage or current are arranged, the gate electrodes of the light-emitting elements being correspondingly connected to the gate electrodes of the transfer elements; a write signal line for applying a current to an anode of each of the light-emitting elements; and current limiting resistors each provided in series to each light-emitting element, respectively, the method comprising a step of determining a voltage of a constant voltage source by which the write signal line is driven via a current limiting resistor so that the temperature coefficient of a light output at a constant current is cancelled by the temperature coefficient of a current supplied to the light-emitting element.

7. A method for driving a self-scanning light-emitting element array comprising a self-scanning transfer element array having such a structure that a plurality of three-terminal transfer elements each having a gate electrode for controlling threshold voltage or current are arranged, the gate electrodes of the transfer elements neighbored to each other are connected via first electrical means, a power supply line is connected to the gate electrodes via second electrical means, and clock lines are connected to an anode of each of the transfer elements; a light-emitting element array having such a structure that a plurality of three-terminal light-emitting elements each having a gate electrode for controlling threshold voltage or current are arranged, the gate electrodes of the light-emitting element being correspondingly connected to the gate electrodes of the transfer elements; a write signal line for applying a current to an anode of each of the light-emitting elements; and one resistor inserted in the write signal line, the method comprising a step of determining a voltage of a constant voltage source by which the write signal line is driven via a current limiting resistor so that the temperature coefficient of a light output at a constant current is cancelled by the temperature coefficient of a current supplied to the light-emitting element.

* * * * *

UNITED STATES PATENT AND TRADEMARK OFFICE
CERTIFICATE OF CORRECTION

PATENT NO. : 6,703,790 B2
DATED : March 9, 2004
INVENTOR(S) : Seiji Ohno

It is certified that error appears in the above-identified patent and that said Letters Patent is hereby corrected as shown below:

Column 7,
Line 38, "Current $i^0$ is denoted by;" should read -- Current $i_0$ is denoted by; --,
Line 52, "ing expression" should read -- ing expression; --.

Column 8,
Line 48, "anode voltage $V_A$ was -7mV/º C." should read -- anode voltage $V_A$ was -7mV/º C --.

Column 9,
Line 8, "$V_A$ was -11.25 mV/ºC.," should read -- $V_A$ was -11.25 mV/ºC --.
Line 10, "$V_D$ was -11.25 mV/ºC.," should read -- $V_D$ was -11.25 mV/ºC, --.

Column 11,
Line 33, "the transfer elements via" should read -- the transfer elements; a --.

Signed and Sealed this

Seventeenth Day of August, 2004

JON W. DUDAS
*Acting Director of the United States Patent and Trademark Office*